United States Patent
Iriya

(10) Patent No.: US 6,705,279 B2
(45) Date of Patent: Mar. 16, 2004

(54) DIRECT INJECTION SPARK IGNITION ENGINE

(75) Inventor: Yuuichi Iriya, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/246,433

(22) Filed: Sep. 19, 2002

(65) Prior Publication Data

US 2003/0062022 A1 Apr. 3, 2003

(30) Foreign Application Priority Data

Oct. 3, 2001 (JP) ........................................ 2001-307123

(51) Int. Cl.[7] .............................................. F02B 31/00
(52) U.S. Cl. ........................ 123/301; 123/305; 123/298; 123/435
(58) Field of Search ..................... 123/298, 301–305, 123/262, 435

(56) References Cited

U.S. PATENT DOCUMENTS

| | | | |
|---|---|---|---|
| 4,526,143 A | * | 7/1985 | Oshima et al. .............. 123/301 |
| 4,641,617 A | * | 2/1987 | Aoyama et al. ............. 123/262 |
| 6,070,566 A | * | 6/2000 | Lee .............................. 123/298 |
| 6,340,016 B1 | * | 1/2002 | Ueda et al. .................. 123/305 |
| 6,530,361 B1 | * | 3/2003 | Shiraishi et al. ............ 123/435 |

FOREIGN PATENT DOCUMENTS

| | | |
|---|---|---|
| EP | 0 835 994 A2 | 4/1998 |
| EP | 0 928 887 A2 | 7/1999 |
| EP | 1 088 972 A2 | 4/2001 |
| JP | 10-8968 | 1/1998 |
| JP | 11-324679 | 11/1999 |
| JP | 2000-87750 A | 3/2000 |

\* cited by examiner

Primary Examiner—Willis R. Wolfe
Assistant Examiner—Johnny H. Hoang
(74) Attorney, Agent, or Firm—Foley & Lardner

(57) ABSTRACT

By setting the configuration of a cavity (25) of a piston (5) appropriately, tumble is produced in air that is aspirated into a combustion chamber (6) inside a cylinder (3) from an intake port (8), and by means of this tumble, the spray of fuel injected by a fuel injector (12) is caused to gather around the periphery of a spark plug (7). A predetermined tumble in the form of an upright ellipse is set in the longitudinal cross section of the cylinder (3) which includes an injection point (I) of the fuel injector (12) and an ignition point (T) of the spark plug (7). The bottom surface (26) of the cavity (25) is curved so as to conform to the radius of curvature (R1) of the lower end of the elliptical tumble, thereby advancing the formation of elliptical tumble which is unlikely to interfere with the cylinder wall surfaces.

11 Claims, 7 Drawing Sheets

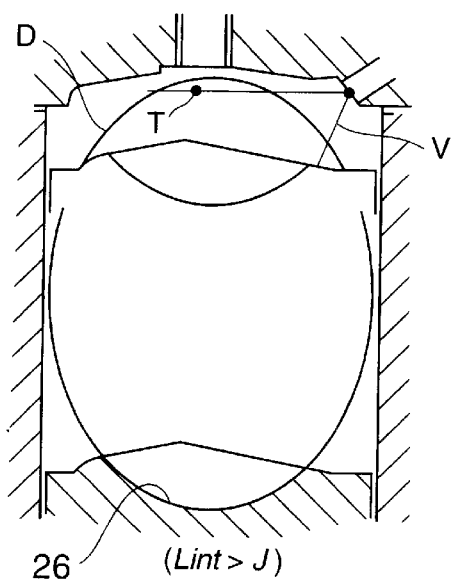
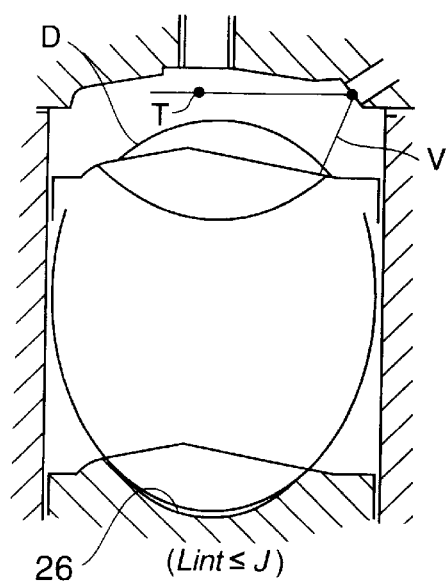
FIG. 7A    FIG. 7B
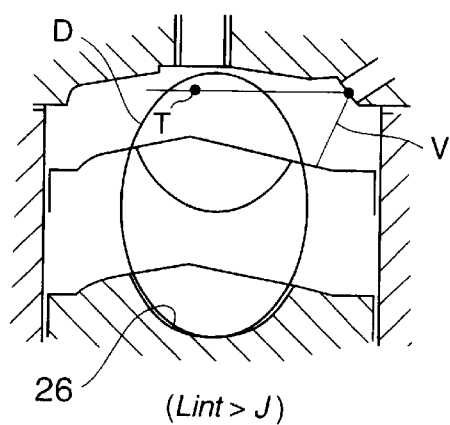
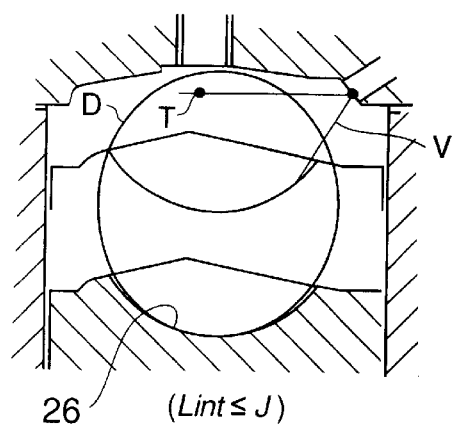
FIG. 11A    FIG. 11B

DIRECT INJECTION SPARK IGNITION ENGINE

FIELD OF THE INVENTION

This invention relates to a configuration of a combustion chamber in a direct injection spark ignition engine.

BACKGROUND OF THE INVENTION

Tokkai 2000-087750 published by the Japanese Patent Office in 2000 discloses a direct injection spark ignition engine which performs stratified combustion in a predetermined operating region. In the stratified combustion operating region of this engine, the spray of fuel which is directly injected into a combustion chamber from a fuel injector is guided to the periphery of a spark plug using the circulation of air formed in a longitudinal direction inside the combustion chamber. As a result, a mass of air-fuel mixture formed on the periphery of the spark plug is ignited by the spark plug. In the following description, the circulation of air in the longitudinal direction will be referred to as "tumble".

In order to form tumble inside the combustion chamber, the prior art engine comprises a tumble generating valve for blocking the lower half of an intake passage. The tumble generating valve is one type of a so-called charge motion control valve (CMCV). When the tumble generating valve is closed in the stratified combustion operating region, the velocity of flow of the air which is aspirated into the combustion chamber from the intake port via an intake valve increases, thereby generating tumble in the combustion chamber. When the fuel injector injects fuel toward this tumble, a mass of air-fuel mixture is produced on the periphery of the spark plug as a result of the gas flow created by the tumble.

Tokkai Hei 10-008968 published in 1998 and Tokkai Hei 11-324679 published in 1999 by the Japanese Patent Office propose that a cavity formed on of the piston be aligned with the curve of the tumble such that a circular tumble having an equal diameter to the cylinder bore is generated in the combustion chamber when the piston is at its bottom dead center.

SUMMARY OF THE INVENTION

Tumble with an equal diameter to the cylinder bore can only exist in the central portion of the cylinder, where the width of the longitudinal cross section of the cylinder is greatest. The width of the longitudinal section of the cylinder gradually decreases in size as it becomes offset from the central portion, and therefore the tumble generated in such a region attenuates due to interference with the wall surfaces of the cylinder. Consequently, strong tumble cannot be formed using the tumble setting of the prior art.

It is therefore an object of this invention to strengthen the tumble generating function of a direct injection spark ignition engine which performs stratified combustion.

In order to achieve the above object, this invention provides a direct injection spark ignition engine, comprising a cylinder in which a combustion chamber is formed, an intake port for supplying air to the combustion chamber, and a piston which compresses the combustion chamber by performing a reciprocal motion inside the cylinder between top dead center and bottom dead center.

The piston has a cavity for producing a tumble in air that is aspirated into the combustion chamber from the intake port as the piston slides toward the bottom dead center. The cavity comprises a bottom surface which is curved to conform to a predetermined tumble which is set in the form of an ellipse having a major axis in the sliding direction of the piston, inside the combustion chamber when the piston is at its bottom dead center.

The details as well as other features and advantages of this invention are set forth in the remainder of the specification and are shown in the accompanying drawings.

BRIEF DESCRIPTION OF THE DRAWINGS

FIGS. 7A and 7B are schematic longitudinal sectional views of the combustion chamber for explaining whether or not the injected fuel overflows the cavity.

FIGS. 11A and 11B are similar to FIGS. 7A and 7B, but showing the

DESCRIPTION OF THE PREFERRED EMBODIMENTS

Figure 1:
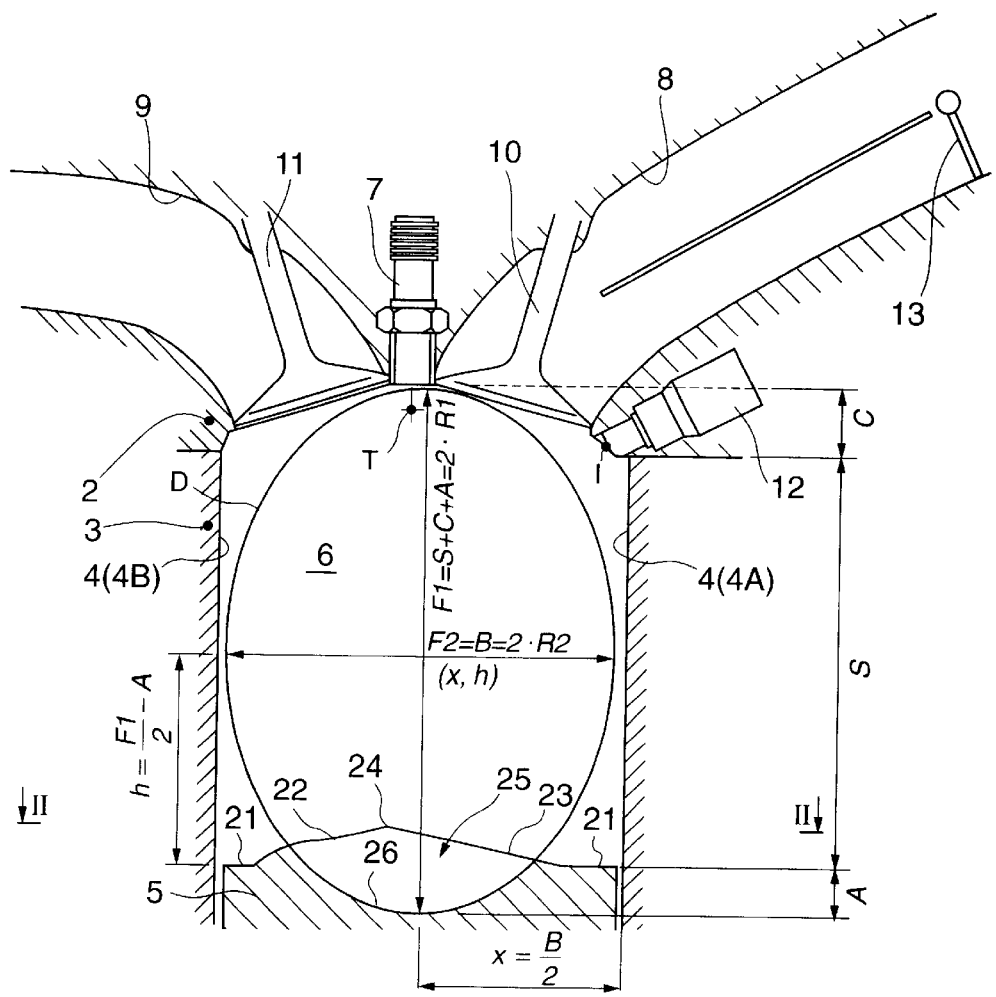
FIG. 1 is a schematic longitudinal sectional view of a direct injection spark ignition engine according to this invention.

Referring to FIG. 1 of the drawings, a direct injection spark ignition engine 1 comprises a piston 5 having a circular cross section which slides inside a cylinder 4 formed in a cylinder block 3. In the interior of the cylinder 4, a combustion chamber 6 is defined by a cylinder head 2 and the piston 5. This figure shows a longitudinal cross section of the engine 1 which is orthogonal to the axis of rotation of the engine 1 and includes the center line of the cylinder 4.

An intake port 8 which aspirates air into the combustion chamber 6 and an exhaust port 9 for discharging combustion gas from the combustion chamber 6 are connected to the combustion chamber 6. The intake port 8 and exhaust port 9 are formed on the cylinder head 2, and are opened and closed by an intake valve 10 and an exhaust valve 11 respectively. A tumble generating valve 13 is provided in the intake port 8 for narrowing the intake port 8 during stratified combustion.

The cylinder head 2 is further provided with a fuel injector 12 for injecting fuel into the combustion chamber 6 and a spark plug 7 for igniting the air-fuel mixture inside the combustion chamber 6. An injection point I of the fuel longitudinal cross section of the engine 1 corresponding to FIG. 1.

The top of the piston 5 comprises a flat base 21 and two inclined planes 22 and 23 which contact each other at a ridge line 24 positioned over the flat base 21. Further, a cavity 25 opened in the inclined planes 22 and 23 is formed on the top of the piston 5.

Figure 2:
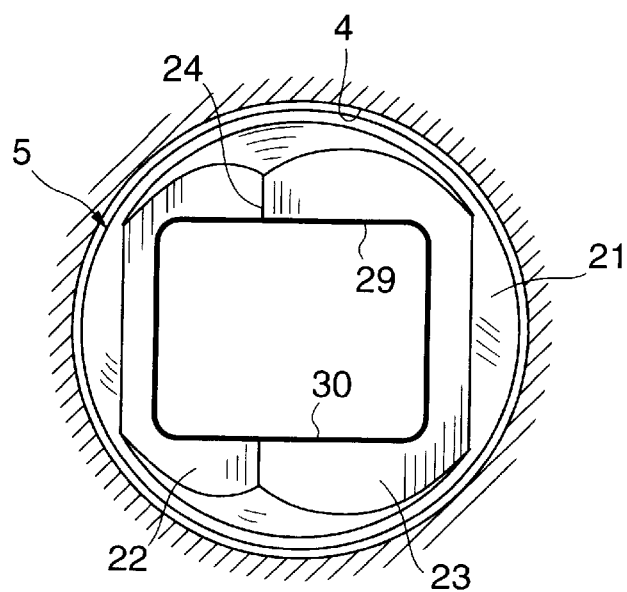
FIG. 2 is a cross-sectional view of a combustion chamber of the engine taken along a line II—II of FIG. 1.
Figure 3:
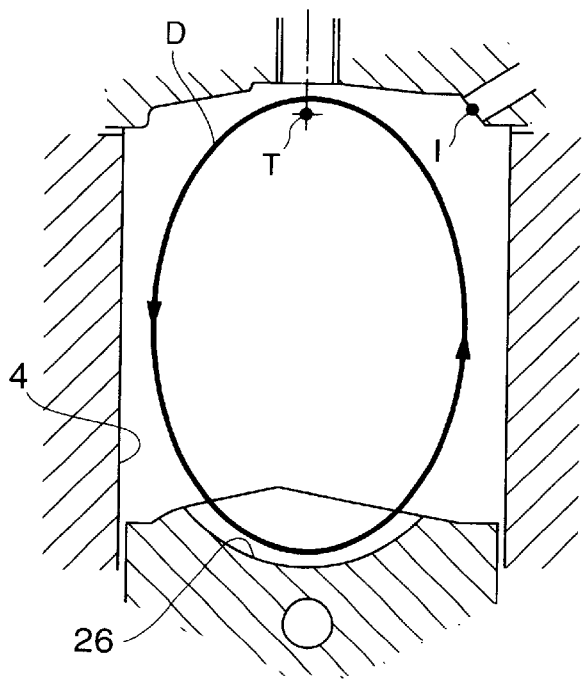
FIG. 3 is a schematic longitudinal sectional view of the combustion chamber for explaining tumble formation.

Referring to FIG. 2 and FIG. 3, the cavity 25 comprises a substantially rectangular opening formed so as to traverse the ridge line 24 which forms the boundary between the inclined planes 22 and 23. The cavity 25 forms a part of the combustion chamber 6. The bottom surface 26 of the cavity 25 is lower than the flat base 21. The cavity 25 is defined by perpendicular guide walls 29 and 30 facing each other and the bottom surface 26. The guide walls 29 and 30 are formed parallel to the longitudinal cross section of the engine 1 corresponding to FIG. 1, that is, at right angles to the axis of rotation of the engine 1. Accordingly, the longitudinal direction of FIG. 2 corresponds to the direction of the axis of rotation of the engine 1.

As is illustrated in FIG. 1, the bottom surface 26 is formed in a curved form so as to produce tumble by guiding the flow of the air aspirated into the combustion chamber 6 from the intake port 8.

When the piston 5 reaches compression top dead center, the distance between the cylinder head 2, which covers the top of the combustion chamber 6, The guide walls 29 and 30 prevent the crushed tumble from dispersing in the direction of the axis of rotation at this time, and thus the tumble is maintained up to the piston 5 reaching its top dead center.

As is understood from FIGS. 1 and 2, the ridge line 24 is slightly offset from the center of the cylinder 4, whereby inclined plane 23 has a larger surface area than inclined plane 22. This measure is taken in order to prevent interference between the intake valve 10 and the piston 5. When the intake valve 10 opens, the front end of the valve body protrudes into the combustion chamber 6 from above. The inclined plane 23 which faces the intake valve 10 is formed larger than the inclined plane 22 on the opposing side so that the valve body does not interfere with the piston 5 when the piston 5 is raised. As a result, the ridge line 24 is offset to the left of center of the cylinder 4 in FIG. 1.

Instead of offsetting the ridge line 24, a cylindrical recess which is matched with the shape of the front end of the valve body may be formed on the top of the piston 5. However, as concerns the manufacture of the piston 5, it is easier to make the ridge line 24 offset from the center of the cylinder 4.

The configuration of the bottom surface 26 of the cavity 25 will now be explained. FIG. 1 illustrates a longitudinal cross section of the cylinder 4 including the injection point I of the fuel injector 12 and the ignition point T of the spark plug 7, wherein the piston 5 is at its bottom dead center.

According to this invention, an ellipse D having its major axis along the stroke direction of the piston 5 is set in this longitudinal cross section of the cylinder 4 as a tumble path, and the configuration of the bottom surface 26 of the cavity 25 is determined on the basis of this ellipse D.

The lower surface of the cylinder head 2 which faces the combustion chamber 6 may take a similar curved form. However, the inventors have found through experiments that a longitudinal cross section in pent roof form, as that shown in the figure, till performs well in the promotion of tumble.

The ellipse D will now be explained in detail.

First, in the longitudinal cross section of FIG. 1, the two-dimensional x-y coordinates are set as follows. The wall surfaces of the cylinder 4 and the longitudinal cross section intersect at two lines of intersection 4A and 4B. The origin of the x-coordinate is set as the right-side line of intersection 4A, and the x-axis is set leftward from this position. Further, the flat base 21 on the top of the piston 5 at its bottom dead center is set as the origin of the y-coordinate, and the y-axis is set upward from this position. The length of the major axis of the ellipse D is F1, and the length of the minor axis is F2.

The length of the major axis F1 of the ellipse D is set as the sum of the stroke length S of the piston 5, the depth A from the flat base 21 of the cavity 25, and the height C of the portion of the combustion chamber 6 inside the pent-roof cylinder head 2, while the length of the minor axis F2 of the ellipse D is set so as to be equal to the inner diameter B of the cylinder 4. Here, F2 is smaller than F1. Using the above coordinate system, the center (X, h) of the ellipse D is expressed as X=B/2, h=(F1/2)−A. Accordingly, the radius of curvature R1 of the part of the ellipse D that contacts the bottom surface 26 becomes R1=(S+C+A)/2. The radius of curvature R2 of the parts of the ellipse D that contact the cylinder wall surfaces becomes R2=B/2. In short, as concerns the longitudinal cross section of the cylinder 4 including the injection point I and the ignition point T, when the piston 5 is at the bottom dead center position, the upper end of the ellipse D contacts the upper end of the combustion chamber 6 in the interior of the cylinder head 2, the lower end of the ellipse D contacts the bottom surface 26 of the cavity 25, and the two side ends of the ellipse D contact the wall surfaces of the cylinder 4.

Figure 12:
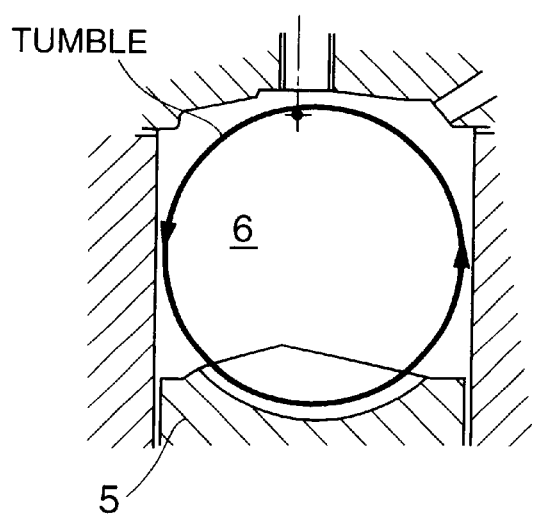
FIG. 12 is a schematic longitudinal sectional view of a combustion chamber in a direct injection spark ignition engine according to the prior art.

Conversely, as is shown in FIG. 12, the tumble in the aforementioned Tokkai Hei10-008968 and Tokkai 11-324679 is set as a true circle. That is, F2=F1, and R1=R2.

As explained previously, the only place where both the tumble along the ellipse D of FIG. 1 and the tumble along the true circle in FIG. 12 can exist without interfering with the wall surfaces of the combustion chamber 6 is the central portion of the cylinder. The further the offset is moved from the central portion of the cylinder in the up or down directions in FIG. 2, the greater the interference between the tumble and the wall surfaces of the cylinder. As a result of the interference with the wall surfaces of the cylinder, circular tumble becomes elliptical, and the radius of curvature R2 of the tumble in the ellipse D in FIG. 1 becomes larger.

In this manner, the direction of the air flow of the tumble in the offset position is forcibly altered by the wall surfaces of the cylinder. Here, the radius of curvature R2 of the part of the tumble in the ellipse D which contacts the wall surfaces of the cylinder is larger than that of the circular tumble in the prior art. Hence, the alteration in the direction of the flow is small, whereby the momentum of the flow is less likely to attenuate than that of the circular tumble.

Note that when tumble is set as an ellipse having its minor axis as the stroke direction of the piston 5, attenuation in the offset position becomes even larger than that in the circular tumble.

As is illustrated in FIG. 3, in order to form elliptical tumble having a major axis in the stroke direction of the piston 5 when the piston 5 is at its bottom dead center, the radius of curvature of the bottom surface 26 is set equal to R1 or a value slightly larger than R1.

Various measures for enhancing tumble in the ellipse D will now be explained.

Figure 4:
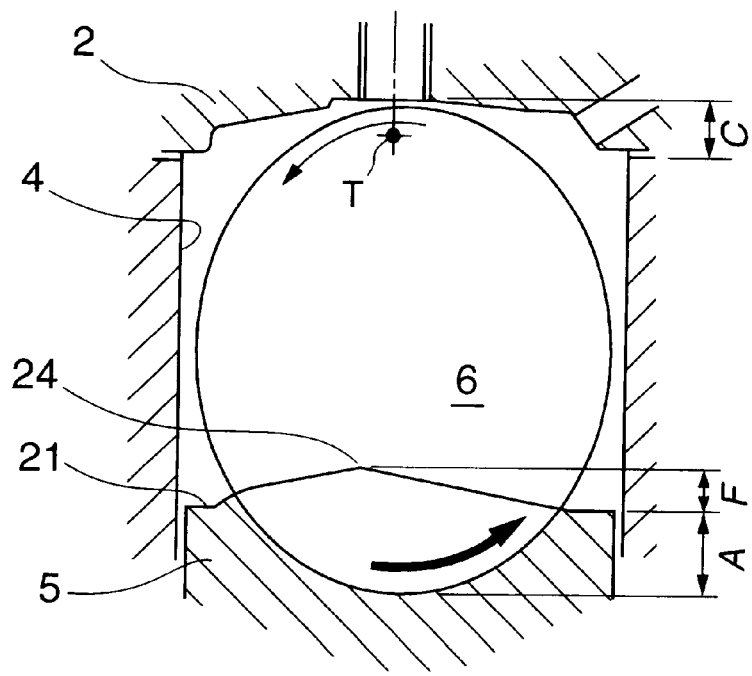
FIG. 4 is a schematic longitudinal sectional view of the combustion chamber for explaining the depth setting of a cavity.

Referring first to FIG. 4, assuming the height from the flat base 21 of the top of the piston 5 to the ridge line 24 thereof is F, if the total value of the ridge line height F plus the depth A of the cavity differs from the height C of the portion of the combustion chamber 6 in the interior of the pent-roof cylinder head 2, that is if A+F≠C, a difference arises in the capacity for forming tumble in the upper end and the lower end of the combustion chamber 6, as is shown by the arrows in the figure. If the balance in tumble-forming efficiency collapses as a consequence, it becomes difficult to maintain tumble over a wide range in the piston 5 stroke.

On the other hand, if A+F≅C, the capacity for forming tumble becomes substantially equal in the upper end and the lower end of the combustion chamber 6, whereby tumble can be maintained over a wide range in the piston 5 stroke.

Figure 5:
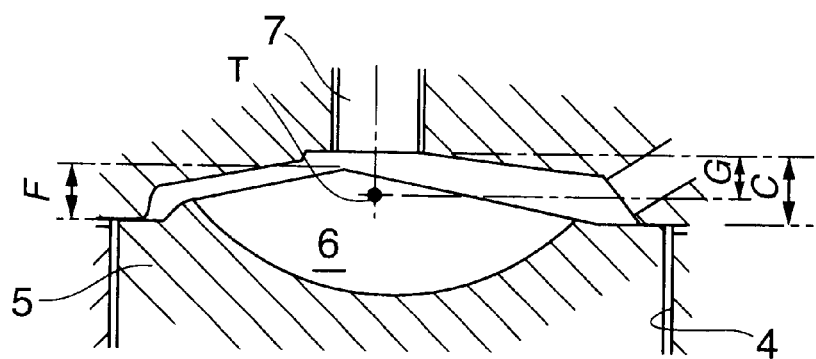
FIG. 5 is a schematic longitudinal sectional view of the combustion chamber during arrival at compression top dead center for explaining the setting of the height of a ridge line on the top of the piston.

Referring subsequently to FIG. 5, assuming that the distance from the upper end of the combustion chamber 6 to the ignition point T of the spark plug 7 is G, a value obtained by deducting G from the height C of the portion of the combustion chamber 6 in the interior of the cylinder head 2 is set to be smaller than the height F of the ridge line 24 of the piston. That is, F≧C−G.

In FIG. 5, the piston 5 is positioned at its top dead center. When the relationship F≧C−G is established, tumble can be maintained even when the piston 5 is at top dead center, as in this case, and air-fuel mixture can be prevented from dispersing in the direction of the axis of rotation upon ignition of the air-fuel mixture by the spark plug 7 in the vicinity of top dead center.

Figure 6:
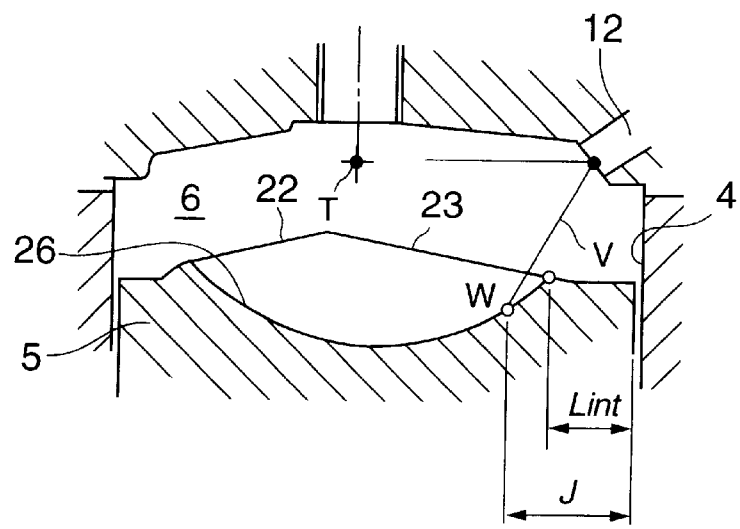
FIG. 6 is a schematic longitudinal sectional view of the combustion chamber for explaining the positional relationship between the injected fuel and the cavity.

Referring next to FIG. 6, the distance from the point of intersection between the bottom surface 26 and the inclined plane 23 to the outer edge of the piston 5 is assumed to be Lint, and the point of intersection between the outer edge V of the cone which indicates the range of dispersion of the fuel injected by the fuel injector 12, and the bottom surface 26 is assumed to be W.

When the distance J from the point of intersection W to the outer edge of the piston 5 is smaller than the distance Lint, a part of the injected fuel flows outside of the cavity 25, as is illustrated in FIG. 7A. When the speed of the engine 1 is low, the tumble momentum is weak. If injected fuel flows outside of the cavity 25 in this state, the fuel overflow will be excluded from the flow of the tumble and discharged from the exhaust port 9 as unburned hydrocarbons (HC). Discharging unburned fuel can impair combustion stability, and can also cause a deterioration in the composition of exhaust emissions.

It is therefore desirable that the radius of curvature of the bottom surface 26 be set such that injected fuel, particularly fuel which is injected at low engine speed, does not flow outside of the cavity 25. Assuming that both the minor axis of the ellipse D and the diameter of the cylinder are fixed, the longer the major axis becomes, the greater the distance Lint becomes, and hence the more likely it becomes that injected fuel will overflow the cavity 25.

However, when the dimensions of contact of the ellipse D with the upper end and lower end of the combustion chamber 6 and the wall surfaces of the cylinder 4 are set to those mentioned above when the piston 5 is at bottom dead center, the condition J≧Lint may not be satisfied. In such a case, as is illustrated in FIG. 7B, the condition J≧Lint may be satisfied by reducing the length of the major axis F1 of the ellipse D with no alterations to the minor axis F2 thereof.

The distance J is calculated based on the stroke position of the piston 5 at the timing when fuel is actually injected by the fuel injector 12.

When the timing of fuel injection from the fuel injector 12 differs in accordance with the speed region of the engine 1, the distance J is calculated accordingly based on the stroke position of the piston 5 at the timing of injection in a low speed region in which tumble momentum is low.

In this example, the low speed region is set as the idling region of the engine 1, and the timing of fuel injection in the idling region is set at a piston stroke position of 40° BTDC–48° BTDC. Accordingly, the distance J is calculated when the piston 5 is in a position between 40° BTDC and 48° BTDC. The idling region is approximately 550 rpm. Here, rpm is an abbreviation of "revolutions per minute", and BTDC is an abbreviation of "before top dead center".

Figure 8:
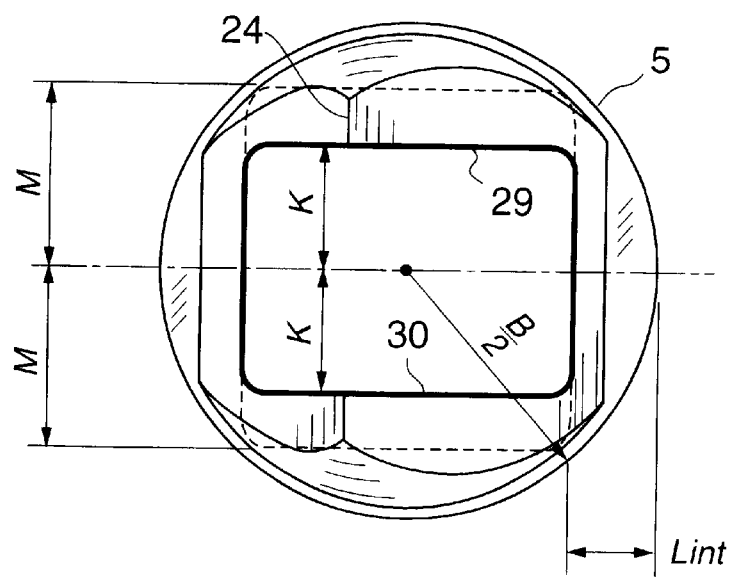
FIG. 8 is a plan view of a piston according to this invention seen from above.

Referring next to FIG. 8, since the cavity 25 has a substantially rectangular transverse cross section, the width thereof in the direction of the axis of rotation, or in other words the space between the guide walls 20 and 30, is limited based on the outer diameter of the piston 5. When the maximum value thereof based on this limitation is rendered as M and the distance K from the central line of the cavity 25 to the guide walls 29 and 30, as shown in the figure, exceeds the maximum value M, an opening facing outward is created at the corners of the cavity 25, whereby tumble spreads outside from this opening, interfering with the wall surfaces of the cylinder 4 and thus attenuating.

The relationship in FIG. 8 between the maximum value M, the diameter B of the circular cross section of the piston 5, and the distance Lint defined according to FIG. 6, is expressed in Equation (1) using a right-angled triangle geometrical formula. Strictly speaking, B indicates the inner diameter of the cylinder 4, but here, B is regarded approximately as the diameter of the piston 5.

$$M^2 + \left(\frac{B}{2} - Lint\right)^2 = \left(\frac{B}{2}\right)^2 \quad (1)$$

By solving Equation (1), Equation (2) is obtained.

$$M = \sqrt{B \cdot Lint - Lint^2} \quad (2)$$

Thus, the distance K from the central line of the cavity 25 to the guide walls 29 and 30 is set in accordance with the following conditional formula (3).

$$K \leq \sqrt{B \cdot Lint - Lint^2} \quad (3)$$

Figure 9A:
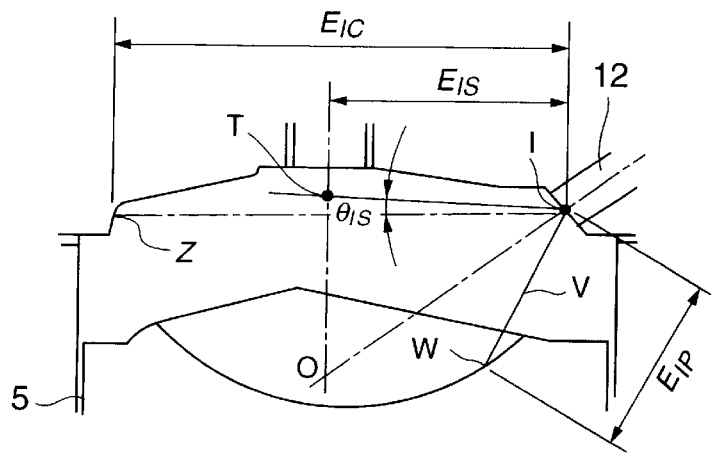
FIGS. 9A through 9C are diagrams for explaining the setting of the angle and strength of fuel injection.
Figure 9B:
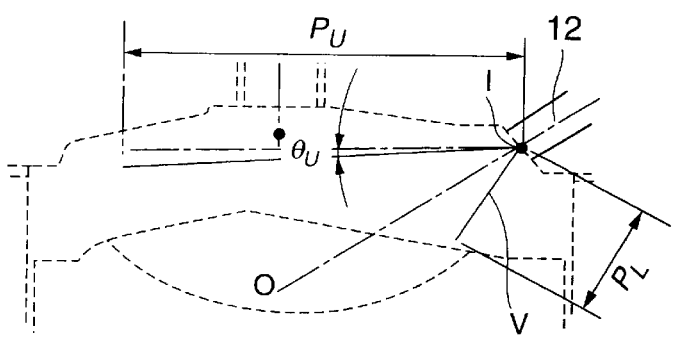
Figure 9C:
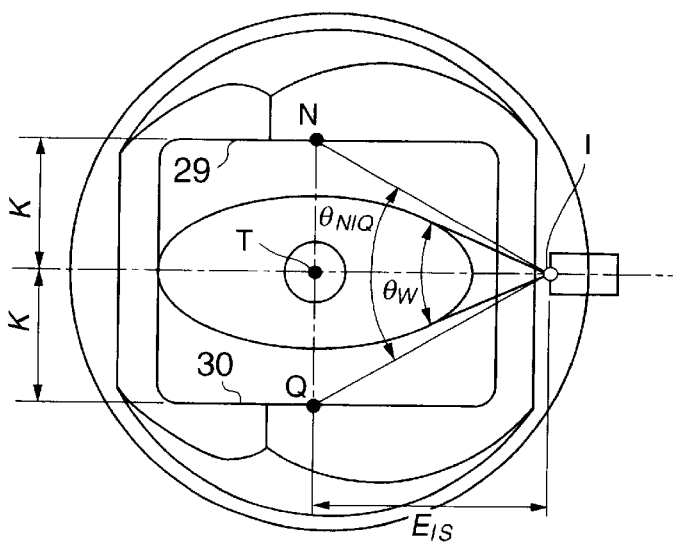

Referring subsequently to FIGS. 9A through 9C, here, the fuel injection characteristic of the fuel injector 12 is determined such that the cone expressing the diffusion range of the fuel injected by the fuel injector 12 takes a slanted conical form. In FIG. 9A, taking the point of intersection between the central axis of the fuel injector 12 and the vertical line which passes through the ignition point T as O, the fuel injection characteristic of the fuel injector 12 is determined such that the angle TIO is greater than the angle WIO. The straight line IO corresponds to the central axis of the fuel injector 12.

In the idling region or the low speed region near the idling region of the engine 1, tumble momentum is sometimes weak, or tumble is sometimes not formed at all. Under such conditions, it is difficult to transport the fuel injected by the fuel injector 12 to the ignition point T of the spark plug 7 using tumble. Therefore, the fuel injection characteristic of the fuel injector 12 is determined by employing an injector with a narrow spray angle and large penetration such that the fuel reaches the ignition point T directly by relying on the injection force. At the same time, the volume of fuel spray that is injected to the upper side of the central axis IO of the fuel injector 12 is set to be larger than the volume of fuel spray injected downward. The fuel injector 12 injects fuel during the period from the closing of the intake valve 8 to the point of ignition of the air-fuel mixture by the spark plug 7. The pressure in the combustion chamber 6 in this period is referred to as "back pressure". The penetration of the injected fuel grows smaller as back pressure increases, but by using a fuel injector 12 with large penetration and strong directivity as described above, the generation of air-fuel mixture toward the ignition point T is ensured during idling or in the low speed region when tumble is weak or not formed at all.

In this case, variations in the air-fuel ratio of the air-fuel mixture in the air-fuel mixture generating region depend upon the time necessary for the air-fuel mixture to reach the ignition point T.

Variations in the air-fuel ratio which are dependent on the time necessary for the air-fuel mixture to reach the ignition point T are eliminated by having the spark plug 7 perform ignition twice. Thus, when the fuel injector 12 is of a type having large penetration and strong directivity, it is desirable that the fuel injector 12 be coupled with a twice-firing spark plug 7. This combination produces the desirable effect of increasing the stability of combustion during idling or in the low speed region. The twice-firing spark plug 7 may be constituted by either a spark plug which uses a plurality of ignition coils, or a spark plug which uses a single coil.

Setting the volume of fuel spray injected to the upper side of the central axis IO of the fuel injector 12 to be larger than the volume of fuel spray injected to the lower side produces the benefit of reducing the likelihood that the fuel spray will collide with the flat base 21 of the piston 5.

FIG. 9A illustrates fuel injection in which there is no back pressure. However, when the same fuel injector 12 conducts fuel injection under back pressure, the form of the fuel spray alters to that shown in FIG. 9B. Here, the angle formed by the outer edge V of the cone above the central axis IO of the fuel injector 12 and the horizontal line which passes through the injection point I is set as the upper end spray angle $\theta_U$. The travel distance of the injected fuel along the outer edge V of the cone above the central axis IO is set as $P_U$. The travel distance of the injected fuel along the outer edge V of the cone below the central axis IO is set as $P_L$.

FIG. 9C is a diagram of the conical dispersion range of the fuel injected by the fuel injector 12 as seen from above. The spray angle $\theta_W$ shown in FIG. 10C indicates the spread of the injected fuel in the horizontal direction.

These values $\theta_U$, $P_U$ and $P_L$, and spray angle $\theta_W$ are set so as to satisfy the following conditional formulas (4)–(8).

$$\theta_{IS}+5° > \theta_U > \theta_{IS}-5° \tag{4}$$

$$E_{IC} > P_U > E_{IS} \tag{5}$$

$$P_L < E_{IP} \tag{6}$$

$$P_U > L\, P_L \tag{7}$$

$$\theta_W < 2 \cdot \tan^{-1}\left(\frac{K}{E_{IS}}\right) \tag{8}$$

where, $\theta_{IS}$=an angle formed between the horizontal line and the line linking the injection point I and the ignition point T in 9A, $E_{IC}$=a horizontal distance between the injection point I and the facing wall surface Z of the combustion chamber 6 in 9A, $E_{IS}$=a horizontal distance between the injection point I and the ignition point T, $E_{IP}$=a distance between the injection point I and the point of intersection W in the low speed region of the engine 1, and L=a constant having a value between 1.2 and 1.3.

Conditional formula (4) means that the upper end spray angle $\theta_U$ is held within a range of plus or minus 5° with respect to the angle $\theta_{IS}$ shown in FIG. 9A. If the upper end spray angle $\theta_U$ is out of this range, a mass of air-fuel mixture is not formed in the preferred state around the ignition point T during idling time or low speed, when tumble is difficult to obtain, and thus stable combustion cannot be guaranteed even with the use of a twice-firing system.

Conditional formula (5) means that the injected fuel along the outer edge V of the upper cone above the central axis IO of the fuel injector 12 travels to the ignition point T but does not reach the wall surface Z on the opposite side of the combustion chamber 6. When $E_{IS} > P_U$, the fuel injected by the fuel injector 12 does not reach the ignition point T, and hence a mass of air-fuel mixture is not generated around the ignition point T so that stable combustion cannot be performed. On the other hand, when $P_U > E_{IC}$, the fuel injected by the fuel injector 12 becomes adhered to the wall surface Z. The fuel that is adhered to the wall surface of the combustion chamber 6 is discharged without being fully burned, causing an increase in hydrocarbons in the exhaust gas.

Conditional formula (6) is the condition for ensuring that the injected fuel along the outer edge V of the cone below the central axis IO does not collide with bottom surface 26 of the cavity 25. When $E_{IP} < P_L$, the injected fuel adheres to the bottom surface 26. The adhered fuel is discharged without being fully burned, causing an increase in hydrocarbons in the exhaust gas.

Conditional formula (7) is the condition for setting the penetration of spray on the upper side of the central axis IO of the fuel injector 12 to be larger than the penetration of the fuel spray on the lower side. By satisfying this condition, the fuel spray injected by the fuel injector 12 reliably reaches the ignition point T, and even when the piston 5 comes within the vicinity of top dead center, the fuel spray injected by the fuel injector 12 can be prevented from adhering to the bottom surface 26 of the cavity 25.

Conditional formula (8) is derived as follows:

In FIG. 9C, the points of intersection of the line passing through the ignition point T and parallel to the axis of rotation with the guide walls 29, 30 are rendered as N, Q. The angle NIQ is expressed by $\theta_{NIQ}$. In order for the fuel spray injected by the fuel injector 12 to be guided inside the cavity 25 without colliding with the guide walls 29 and 30, the spray angle $\theta_W$ must be made smaller than $\theta_{NIQ}$.

$$\theta_W < \theta_{NIQ} \tag{9}$$

The following equation (10) is established in respect of the right-angled NIT shown in FIG. 9C.

$$\tan\left(\frac{\theta_{NIQ}}{2}\right) = \frac{K}{E_{IS}} \tag{10}$$

The following equation (11) is obtained for $\theta_{NIQ}$ from Equation (11) above.

$$\theta_{NIQ} = 2 \cdot \tan^{-1}\left(\frac{K}{E_{IS}}\right) \quad (11)$$

When Equation (11) is substituted for Equation (9), Conditional formula (8) is obtained.

If the spray angle $\theta_W$ of the fuel injector 12 is set so as to satisfy Conditional formula (8), the fuel is reliably injected inside the cavity 25, and even when the piston 5 comes to top dead center, the fuel spray can be prevented from spreading from the cavity 25 in the direction of the axis of rotation.

In formula (8), $E_{IS}$ indicates the horizontal distance between the injection point I and the ignition point T. However, $E_{IS}{'}$ may be set as the distance between the injection point I and the point O and the distance $E_{IS}{'}$ may be inserted into Conditional formula (8) instead of the distance $E_{IS}$ to set the spray angle $\theta_W$.

Next, referring to FIG. 10, and FIGS. 11A and 11B, a second embodiment of this invention will be explained.

Figure 10:
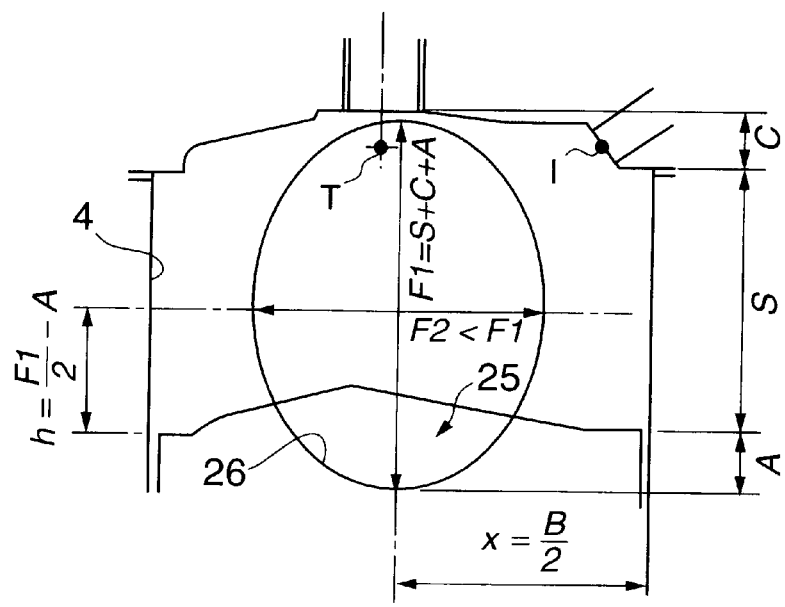
FIG. 10 is a schematic longitudinal sectional view of a combustion chamber in a direct injection spark ignition engine according to a second embodiment of this invention.

In this embodiment, referring to FIG. 10, the ellipse D which corresponds to the tumble path determined with the piston 5 at its bottom dead center does not contact the wall surfaces of the cylinder 4. In other words, in this example, the length of the minor axis F2 of the ellipse D is set at a value which is smaller than the inner diameter B of the cylinder 4. The setting of the radius of curvature of the bottom surface 26 at R1 or at a value slightly larger than R1 is the same as in the first embodiment.

In the engine illustrated in FIG. 10, the stroke distance of the piston 5 with respect to the inner diameter B of the cylinder 4 is smaller than that of the engine 1 in the first embodiment. In an engine of this kind, an ellipse D which is long in the longitudinal direction sometimes cannot be set when the piston 5 is at bottom dead center.

However, in an engine such as that shown in FIG. 10, by setting the radius of curvature of the bottom surface 26 of the cavity 25 on the basis of an ellipse D having a minor axis F2 which is smaller than the inner diameter of the cylinder 4, tumble in the form of an upright ellipse can be formed, and, as in the first embodiment an environment in which tumble is unlikely to attenuate can be obtained even in a position which is offset from the central portion of the cylinder in the direction of the axis of rotation.

Referring subsequently to FIGS. 11A and 11B, if, in this engine also, the distance J between the point of intersection W and the outer edge of the piston 5 is smaller than the distance Lint as was explained in relation to the first embodiment, a part of the fuel injected in the vicinity of top dead center overflows outside of the cavity 25 as is illustrated in FIG. 11A. In such a case, the condition J≧Lint can be satisfied by lengthening the minor axis F2 of the ellipse D without altering the major axis F1, as is illustrated in FIG. 11B.

In this embodiment also, by applying the dimensions set as shown in FIGS. 4 and 5 and the specification for the fuel injector 12 set as shown in FIGS. 9A–9C, the tumble generating function can be further strengthened.

The contents of Tokugan 2001-307123, with a filing date of Oct. 3, 2001 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A direct injection spark ignition engine, comprising:
   a cylinder in which a combustion chamber is formed;
   an intake port for supplying air to the combustion chamber; and
   a piston which compresses the combustion chamber by performing a reciprocal motion inside the cylinder between top dead center and bottom dead center, the piston having a cavity for producing a tumble in air that is aspirated into the combustion chamber from the intake port as the piston slides toward the bottom dead center, and the cavity comprising a bottom surface which is curved to conform to a predetermined tumble which is set in the form of an ellipse having a major axis in the sliding direction of the piston, inside the combustion chamber when the piston is at its bottom dead center.

2. The engine as defined in claim 1, wherein the engine further comprises a cylinder head which faces the piston and thereby defines the combustion chamber, the major axis of the ellipse has an end which contacts the cylinder head and another end which contacts the cavity, and the ellipse further has a minor axis which is perpendicular to the major axis and has a length equal to a diameter of the cylinder.

3. The engine as defined in claim 1, wherein the engine further comprises a cylinder head which faces the piston and thereby defines the combustion chamber, the major axis of the ellipse has an end which contacts the cylinder head and another end which contacts the cavity, and the ellipse further has a minor axis which is perpendicular to the major axis and has a length smaller than a diameter of the cylinder.

4. The engine as defined in claim 1, wherein the engine further comprises a fuel injector having an injection point which faces the combustion chamber and a spark plug having an ignition point which faces the combustion chamber, and the predetermined tumble is established in a longitudinal cross section of the combustion chamber which includes the injection point and the ignition point.

5. The engine as defined in claim 4, wherein the piston comprises a flat base facing toward the combustion chamber, and a protruding portion which protrudes toward the combustion chamber from the flat base, the protruding portion comprises two inclined planes which are joined via a ridge line, and the cavity is formed in the protruding portion and defined by vertical guide walls which are parallel to the longitudinal cross section and the bottom surface positioned between the guide walls.

6. The engine as defined in claim 4, wherein the fuel injector has a central axis, and is configured to inject fuel from the injection point toward the combustion chamber with a conical spray form formed around the central axis, an outer edge of the conical spray form being positioned between the central axis and the piston without reaching the outside of the cavity.

7. The engine as defined in claim 6, wherein the conical spray form is defined with respect to the piston at a position corresponding to a fuel injection timing of the fuel injector when the engine is running idle.

8. The engine as defined in claim 6, wherein the fuel injector is configured to have a penetration which is strong enough to cause an outer edge of the conical spray form positioned opposite to the piston with respect to the central axis to reach the ignition point.

9. The engine as defined in claim 8, wherein the fuel injector is configured to cause a volume of fuel injected above the central axis to be larger than a volume of fuel injected below the central axis.

10. A direct injection spark ignition engine, comprising:

a cylinder in which a combustion chamber is formed;

an intake port for supplying air to the combustion chamber;

a piston which compresses the combustion chamber by performing a reciprocal motion inside the cylinder between top dead center and bottom dead center, the piston having a cavity for producing a tumble in air that is aspirated into the combustion chamber from the intake port as the piston slides toward the bottom dead center, and the cavity comprising a bottom surface which is curved to conform to a predetermined tumble which is set in the form of an ellipse having a major axis in the sliding direction of the piston, inside the combustion chamber when the piston is at its bottom dead center;

a fuel injector having an injection point which faces the combustion chamber and a spark plug having an ignition point which faces the combustion chamber, the predetermined tumble being established in a longitudinal cross section of the combustion chamber which includes the injection point and the ignition point; and a cylinder head which faces the piston and thereby defines the combustion chamber, wherein the piston comprises a flat base facing toward the combustion chamber, and a protruding portion which protrudes toward the combustion chamber from the flat base, the protruding portion comprises two inclined planes which are joined via a ridge line, and the cavity is formed in the protruding portion and defined by vertical guide walls which are parallel to the longitudinal cross section and the bottom surface positioned between the guide walls, and wherein the sum of the depth of the deepest point of the cavity from the flat base and the height of the guide walls from the flat base is set equal to the height of a portion of the combustion chamber that is in the interior of the cylinder head.

11. The engine as defined in claim 10, wherein the height of the ridge line is set to a value that causes a distance between the ridge line and the cylinder head when the piston is at the top dead center to be smaller than a distance between the ignition point and the cylinder head.

* * * * *